3,171,252
TURBINE OPERATED ENGINE STARTERS
David Roy Trowbridge, Hutton Mount, near Brentwood, and Norman Moss, Ilford, England, assignors to The Plessey Company Limited, Ilford, England, a British company
Filed June 17, 1963, Ser. No. 288,563
Claims priority, application Great Britain, June 27, 1962, 24,654
2 Claims. (Cl. 60—39.14)

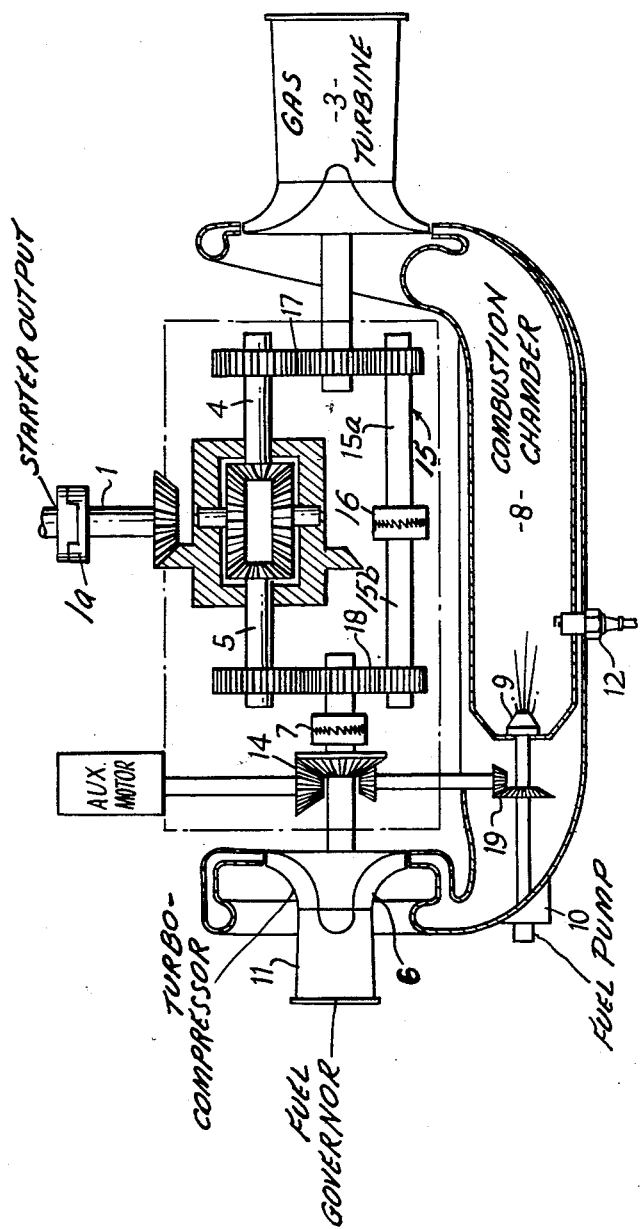

This invention relates to turbine-operated engine starters, more particularly for aircraft turbine engines, and has for an object to provide an improved turbine-operated engine starter enabling the main starting effort to be performed by ordinary aircraft fuel as distinct from a fuel capable of burning without the addition of air, such as a monofuel.

According to the present invention the starter comprises a so-called differential gas turbine, i.e. a gas turbine the shaft of which is coupled by a differential gear drive on the one hand to a compressor for its own combustion air and on the other hand to the starter output shaft, and an auxiliary starter motor is provided which acts on the compressor, the latter being coupled to the differential gear drive via an over-running clutch which will transmit torque from the differential gear drive to the compressor in its normal running direction but not conversely transmit torque from the compressor running in its normal direction to the differential gear drive. According to a subsidiary feature of the invention a further over-running clutch may be provided between the gas turbine and the compressor, by-passing the differential gear drive and thus ensuring that the turbine will drive its compressor and the output shaft of the differential gear drive even if the torque resistance at the starter output virtually disappears.

An embodiment of the invention intended as a combined engine starter for an aircraft turbine and emergency drive for auxiliary equipment is illustrated in the accompanying drawing, which is a somewhat diagrammatic plan view, partly in section, showing the starter layout.

Referring now to the drawing, the output shaft 1 of the illustrated starter unit includes the usual over-running clutch and forms one of the three branches or legs of a differential gear drive contained in a differential-gear box 2, which receives its driving power from a gas turbine 3 through a second leg 4 of the drive, while a third leg 5 drives, via a one-way or over-running clutch 7, an air turbo-compressor 6 which supplies combustion air to a combustion chamber 8. This chamber feeds the turbine 3 and contains a burner nozzle 9 which receives its fuel from a fuel pump 10, which preferably is connected with the compressor 6 so as to be driven jointly with the latter. The compressor 6 also incorporates a governor 11 which so controls the fuel supply to the burner 9 as to limit the compressor speed to a maximum of, for example, 60,000 r.p.m. The combustion chamber 8 is also equipped with an ignition device 12, and in order to allow the starter to commence operation with ordinary aircraft fuel, an electric auxiliary motor 13 is provided which when energised drives the compressor 6 and fuel pump 10 via gearing 14, 19 to provide an initial charge of the combustion chamber 8. Once this initial charge has been ignited, the turbine 3 starts operation and, in the absence of any load on leg 5 of the differential gear box, will almost instantaneously accelerate this leg sufficiently to take over the drive of the compressor via the over-running clutch 7. The electric motor 13 may then be switched off manually or by a suitable automatic device operated, for example, by the over-running clutch 7. From this moment there will be a load on leg 5 determined by the resistance of the compressor drive, and this load will increase until the compressor reaches its intended speed of 60,000 r.p.m. whereafter the load on leg 5, and thus the output torque on shaft 1, is kept constant by the fuel governor 11.

With the arrangement as so far described the drive from the turbine 3 to the compressor 6 is dependent on the existence of a load torque on the starter-output shaft 1, and while such load torque will be always present when the device is used for starting the engine, the output shaft 1 is equipped with a clutch 1a by means of which the output shaft 1 can be uncoupled from the engine when, for example, the turbine 3 is intended to be used to drive engine auxiliaries in the case of a failure of the main engine or during so-called ground-running for testing or ground manoeuvring purposes. It will be appreciated that when the clutch 1a is disengaged, no load torque is available at shaft 1. In order to ensure that under such conditions the compressor will nevertheless be reliably driven by the turbine, thus allowing the unit to be successfully used in such circumstances, the two ends of a shaft 15 by-passing the differential gear drive and subdivided by a second over-running clutch 16 are respectively drivingly connected by gearing 17 to the turbine-driven leg 4 and by gearing 18 to the compressor-driving leg 5 of the differential gear drive, the transmission ratios being so chosen that the speed of the turbine-driven part 15a of the shaft 15 exceeds the speed at which the other part 15b of the shaft is driven through the differential gear set 2. The clutch will therefore engage whenever the ratio of the speed of the compressor shaft to the speed of the starter-turbine shaft falls below that which prevails when, with the turbo-compressor operating at its maximum governed speed and the output shaft 1 revolving at the starter-decoupling speed, the turbine 3 reaches the maximum speed of its operating range.

The embodiment described with reference to the drawing may be modified in certain details without exceeding the scope of the invention. Thus the fuel pump 10, instead of being driven jointly with the compressor, may be driven by a separate electric motor throughout operation of the unit.

What we claim is:
1. A turbine-operated engine starter comprising: a gas turbine having a turbine shaft and a combustion chamber; a turbo-compressor for supplying air to said combustion chamber, said compressor including a compressor shaft having a normal direction of rotation; a starter output shaft; a three-leg differential gear drive having its three legs operatively connected respectively to said turbine shaft, said compressor shaft, and said output shaft; an auxiliary starter motor; drive means operatively connecting said auxiliary motor with said compressor shaft; and an over-running clutch interposed between the compressor shaft and the differential-gear drive to transmit rotation from the differential-gear drive to the compres- sor shaft for driving the latter in its normal operating direction while allowing the compressor shaft to exceed the speed of rotation thus transmitted.

2. An engine starter as claimed in claim 1, including by-pass drive means operatively interconnecting the gas-turbine shaft and the compressor shaft and by-passing the differential gear drive, said by-pass drive means including a further over-running clutch operative to transmit rotation to the compressor shaft in its normal direction while allowing the compressor shaft to exceed the speed of rotation thus transmitted.

References Cited by the Examiner
UNITED STATES PATENTS

| | | | |
|---|---|---|---|
| 2,999,356 | 9/61 | Furgason | 60—39.14 |
| 3,063,242 | 11/62 | Broad | 60—39.14 |

SAMUEL LEVINE, *Primary Examiner.*